(12) United States Patent
Liu et al.

(10) Patent No.: US 8,824,262 B1
(45) Date of Patent: Sep. 2, 2014

(54) DISK DRIVE ACCOUNTING FOR SINUSOIDAL OFFSET BETWEEN HEADS WHEN EXECUTING A ROTATIONAL POSITION OPTIMIZATION ALGORITHM

(71) Applicant: Western Digitial Technologies, Inc., Irvine, CA (US)

(72) Inventors: Kexiu Liu, Foothill Ranch, CA (US); Orhan Beker, Dove Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/051,604

(22) Filed: Oct. 11, 2013

Related U.S. Application Data

(60) Provisional application No. 61/867,459, filed on Aug. 19, 2013.

(51) Int. Cl.
  *G11B 15/12* (2006.01)
  *G11B 5/596* (2006.01)
(52) U.S. Cl.
  USPC .......................................... 369/63; 360/77.04
(58) Field of Classification Search
  USPC .......... 360/63, 64, 77.04, 78.05, 77.08, 78.01
  See application file for complete search history.

(56) References Cited

U.S. PATENT DOCUMENTS

| | | | |
|---|---|---|---|
| 5,917,672 A | 6/1999 | Pham et al. | |
| 5,943,179 A | 8/1999 | Fukushima | |
| 5,969,895 A | 10/1999 | Ueda et al. | |
| 6,031,683 A | 2/2000 | Iverson et al. | |
| 6,292,320 B1 * | 9/2001 | Mason et al. | 360/63 |
| 6,388,413 B1 | 5/2002 | Ng et al. | |
| 6,937,424 B2 | 8/2005 | Chang et al. | |
| 6,952,322 B1 | 10/2005 | Codilian et al. | |
| 6,968,422 B1 | 11/2005 | Codilian et al. | |
| 7,075,747 B2 | 7/2006 | Takaishi | |
| 7,092,184 B2 | 8/2006 | Settje et al. | |
| 7,145,745 B1 | 12/2006 | Shepherd et al. | |
| 7,333,288 B2 | 2/2008 | Kim et al. | |
| 7,411,760 B2 | 8/2008 | Auerbach et al. | |
| 7,471,486 B1 | 12/2008 | Coker et al. | |
| 7,529,051 B2 | 5/2009 | Hanson et al. | |
| 7,539,814 B2 | 5/2009 | Pollock et al. | |
| 7,679,854 B1 | 3/2010 | Narayana et al. | |
| 7,746,593 B2 | 6/2010 | Sudo | |
| 2008/0002280 A1 | 1/2008 | Asakura | |
| 2010/0073808 A1 | 3/2010 | Eppler et al. | |
| 2012/0002314 A1 | 1/2012 | Huang et al. | |
| 2012/0275050 A1 | 11/2012 | Wilson et al. | |

* cited by examiner

*Primary Examiner* — Nabil Hindi

(57) ABSTRACT

A disk drive is disclosed wherein a radial offset is measured between a first head and a second head at a plurality of points along a circumference of a corresponding first and second disk surface to generate a first plurality of radial offsets. A first radial offset is determined and a second radial offset is determined based on the first plurality of radial offsets, wherein the first radial offset corresponds to approximately a maximum in the first plurality of radial offsets and the second radial offset corresponds to approximately a minimum in the first plurality of radial offsets. A plurality of access commands are stored in a command queue, and a rotational position optimization (RPO) algorithm is executed to select a next access command to execute from the command queue, wherein the RPO algorithm is responsive to the first and second radial offsets.

24 Claims, 7 Drawing Sheets

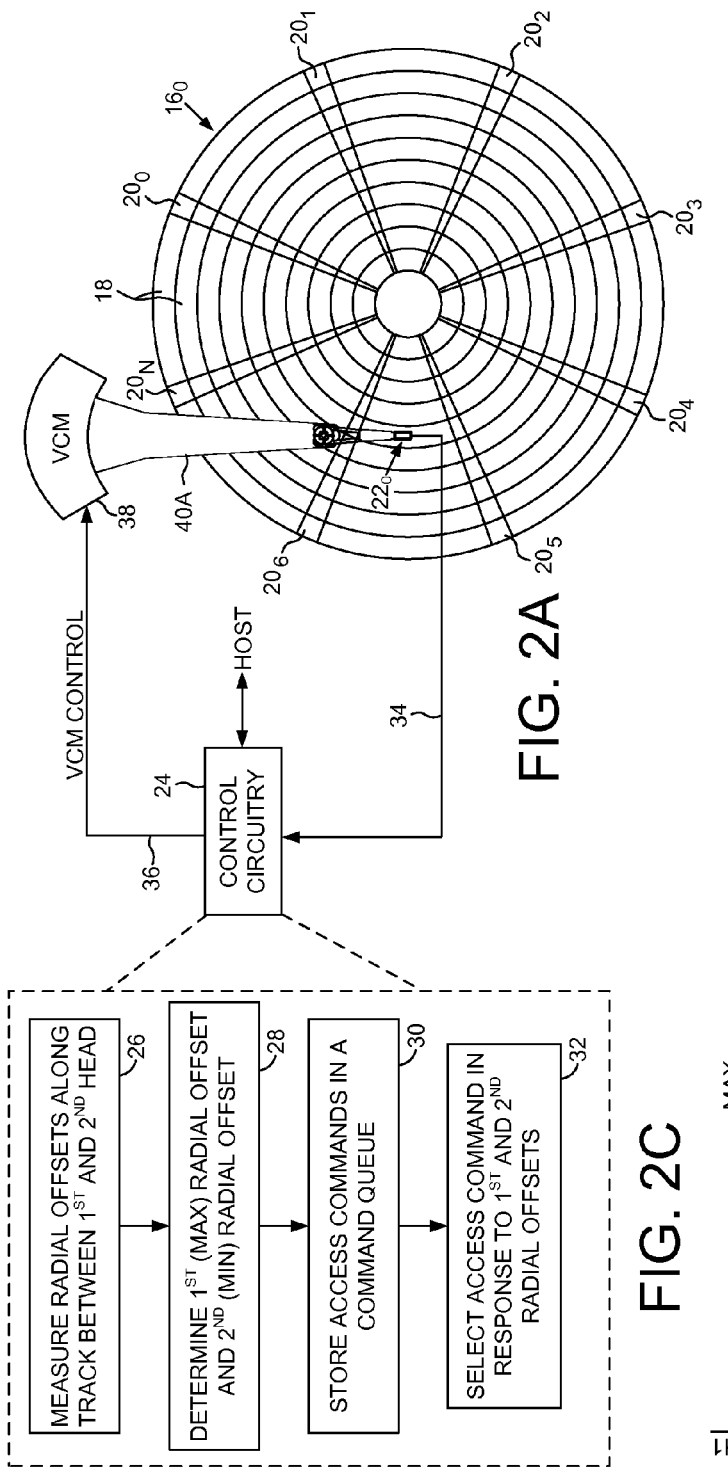
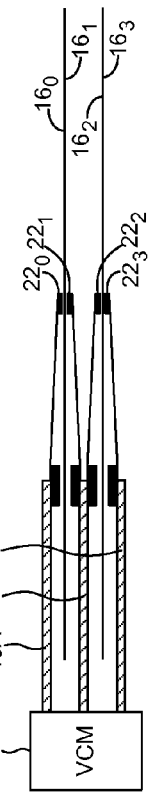
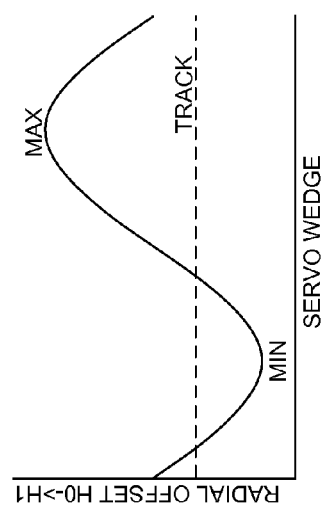

$|s0 + h_{min}| > |s0 + h_{max}| \Rightarrow S = s0 + h_{min}$ $|s0 + h_{min}| < |s0 + h_{max}| \Rightarrow S = s0 + h_{max}$ $|s0 + h_{min}| > |s0 + h_{max}| \Rightarrow S = s0 + h_{min}$

DISK DRIVE ACCOUNTING FOR SINUSOIDAL OFFSET BETWEEN HEADS WHEN EXECUTING A ROTATIONAL POSITION OPTIMIZATION ALGORITHM

CROSS-REFERENCE TO RELATED APPLICATIONS

This application claims priority to provisional U.S. Patent Application Ser. No. 61/867,459, filed on Aug. 19, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Multiple access commands may be received from the host while the disk drive is executing a current access command. The access commands are typically buffered in a command queue, and when the disk drive is finished executing the current command, a next command is chosen from the command queue according to a rotational position optimization (RPO) algorithm. The RPO algorithm attempts to choose the next command that will minimize the mechanical latency in accessing the disk, including the seek time required to move the head to the target track and the rotation time for the head to reach the target data sector.

BRIEF DESCRIPTION OF THE DRAWINGS

FIGS. 2A and 2B show a disk drive according to an embodiment comprising a plurality of disk surfaces with at least one head actuated over each disk surface.

FIG. 2C is a flow diagram according to an embodiment wherein a radial offset between a first head and a second head is measured at a plurality of points along a circumference of a corresponding first and second disk surface to generate a first plurality of radial offsets that are used to implement a rotational position optimization (RPO) algorithm.

FIG. 2D illustrates an example of a radial offset between the first and second heads at different points along the circumference of the corresponding first and second disk surface according to an embodiment.

DETAILED DESCRIPTION

Figure 1:
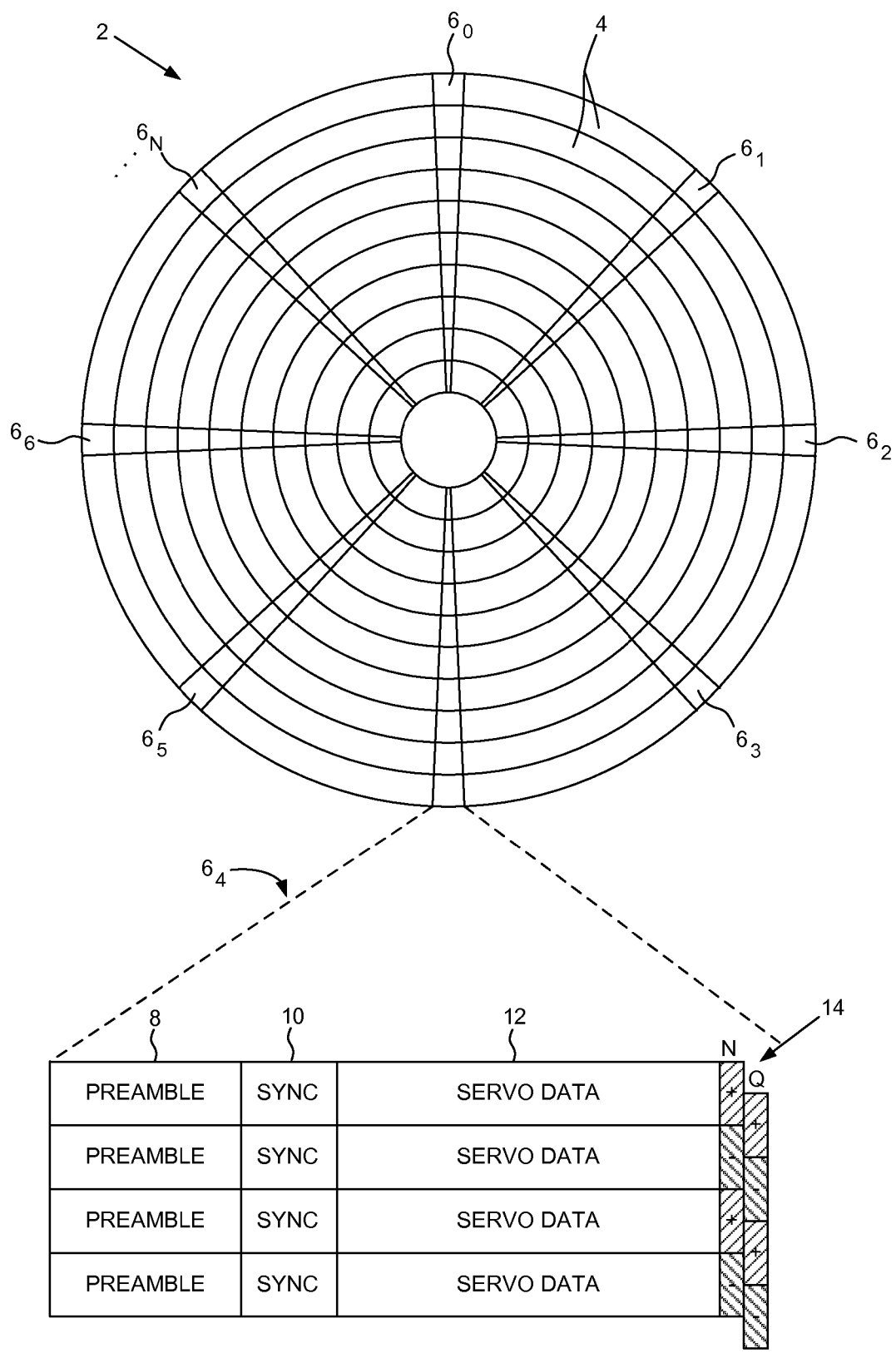
FIG. 1 shows a prior art disk format comprising a plurality of servo tracks defined by servo sectors.

FIGS. 2A and 2B show a disk drive according to an embodiment comprising a plurality of disk surfaces $16_0$-$16_3$ each comprising a plurality of data tracks 18, wherein each data track comprises a number of data sectors and a number of servo sectors $20_0$-$20_N$. The disk drive further comprises a plurality of heads $22_0$-$22_3$ including at least one head actuated over each disk surface, and control circuitry 24 operable to execute the flow diagram of FIG. 2C which is understood with the example shown in FIG. 2D. A radial offset between a first head and a second head is measured at a plurality of points along a circumference of a corresponding first and second disk surface to generate a first plurality of radial offsets (block 26). A first radial offset and a second radial offset is determined based on the first plurality of radial offsets, wherein the first radial offset corresponds to approximately a maximum in the first plurality of radial offsets and the second radial offset corresponds to approximately a minimum in the first plurality of radial offsets (block 28). A plurality of access commands are stored in a command queue (block 30), and a rotational position optimization (RPO) algorithm is executed to select a next access command to execute from the command queue (block 32), wherein the RPO algorithm is responsive to the first and second radial offsets.

In the embodiment of FIG. 2A, the control circuitry 24 processes a read signal 34 emanating from the first head $22_0$ to demodulate the servo sectors $20_0$-$20_N$ and generate a position error signal (PES) representing an error between the actual position of the head and a target position relative to a target data track. The control circuitry 24 filters the PES using a suitable compensation filter to generate a control signal 36 applied to a voice coil motor (VCM) 38 which rotates an actuator arm 40A about a pivot in order to actuate the first head $22_0$ radially over the first disk surface $16_0$ in a direction that reduces the PES. The servo sectors $20_0$-$20_N$ may comprise any suitable head position information, such as a track address for coarse positioning and servo bursts for fine positioning. The servo bursts may comprise any suitable pattern, such as an amplitude based servo pattern or a phase based servo pattern.

As the control circuitry 24 executes the access commands stored in the command queue, it may be necessary to switch between disk surfaces, such as by switching from the first disk surface $16_0$ to the second disk surface $16_1$ in FIG. 2B. Although the embodiment in FIG. 2B shows a disk drive comprising four disk surfaces, the disk drive may comprise a fewer number or a greater number of disk surfaces. In one embodiment, there is a radial offset between the heads that may be due, for example, to a misalignment of the center of the disks when clamped to a spindle motor, or a written-in error of the servo sectors that varies between the disk surfaces. FIG. 2D shows an example radial offset between a first head $22_0$ and a second head $22_1$ which varies relative to the servo sector number (servo wedge). In one embodiment, the radial offset between the first and second heads may comprise a sinusoid as illustrated in FIG. 2D which may be due, for example, to a difference between a repeatable runout (RRO) of each disk surface. Whether or not the waveform representing the radial offset is sinusoidal, in one embodiment the waveform is substantially repeatable with each revolution of the disk, and therefore the radial offset will comprise a maximum value and a minimum value as illustrated in FIG. 2D. In an embodiment described below, the waveform representing the radial offset may vary with changes in ambient temperature due to a thermal expansion of the disks and/or the head assemblies. In addition, the waveform representing the radial offset may vary as the radial location of the head varies.

Figure 3:
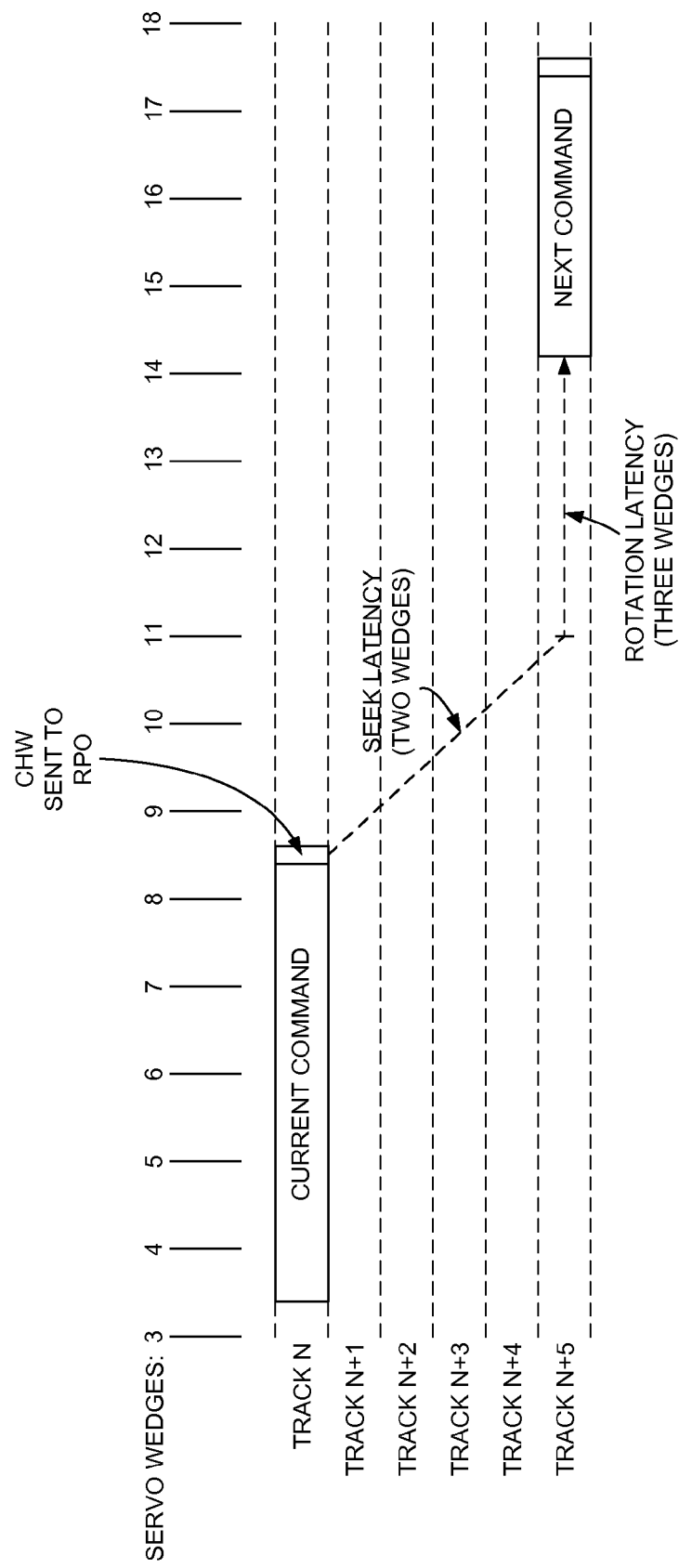
FIG. 3 illustrates a seek latency and a rotational latency evaluated by the RPO algorithm according to an embodiment when selecting a next access command to execute from a command queue.

In one embodiment, the control circuitry 24 executes an RPO algorithm which selects the next access command to execute from the command queue based on an access cost computed for each command. FIG. 3 illustrates a current access command being executed at track N and a next access command to execute at track N+5. Accordingly, there is an access cost including a seek latency (two servo wedges in this example) associated with positioning the head over track N+5 as well as a rotation latency (three servo wedges in this example) associated with waiting for the head to reach the first data sector of the next access command. However, when there is a radial offset between heads of different disk surfaces, it may affect the seek latency for an access command depending on the magnitude and polarity of the radial offset.

Figure 4A:
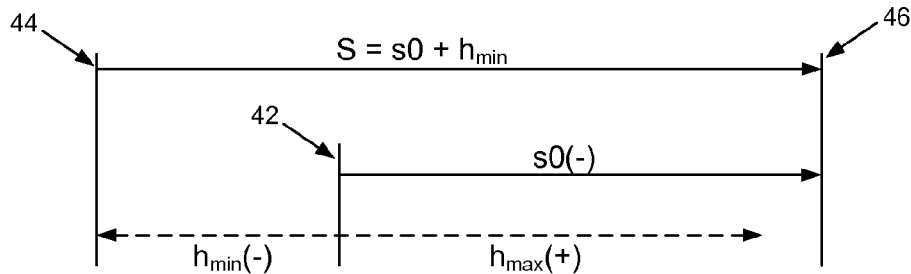
FIGS. 4A-4C illustrate different example embodiments of how the radial offset between heads may affect the seek latency for an access command in the command queue.

This is illustrated in FIG. 4A wherein when the first head $22_0$ is being used to access a data track 42 on the first disk surface $16_0$, the control circuitry may evaluate an access command in the command queue having a seek distance of s0 from a current data track 42 relative to the first disk surface $16_0$. However, if the access command corresponds to the second disk surface $16_1$, the actual seek distance will vary based on the radial offset between the first and second heads. In the example of FIG. 4A, the radial offset between the first and second head varies between a minimum ($h_{min}$) and a maximum ($h_{max}$) depending on the servo sector when the switch occurs. Also in the example of FIG. 4A, $h_{min}$ has a negative polarity relative to the seek direction of S0, and therefore $h_{min}$ increases the seek length, whereas $h_{max}$ has a positive polarity relative to the seek direction S0, and therefore $h_{max}$ decreases the seek length.

In one embodiment, the control circuitry evaluates both $h_{min}$ and $h_{max}$ in order to compute a worst case seek latency for an access command requiring a head switch. In the example of FIG. 4A the absolute value $|S0+h_{min}|$ is greater than the absolute value $|s0+h_{max}|$ and therefore the worst case seek length for the access command is computed as $s0+h_{min}$ (both quantities are negative, thereby increasing the seek length by $h_{min}$). Accordingly, after the head switch the worst case seek will begin at data track 44 and end at data track 46 on the second disk surface.

Figure 4B:
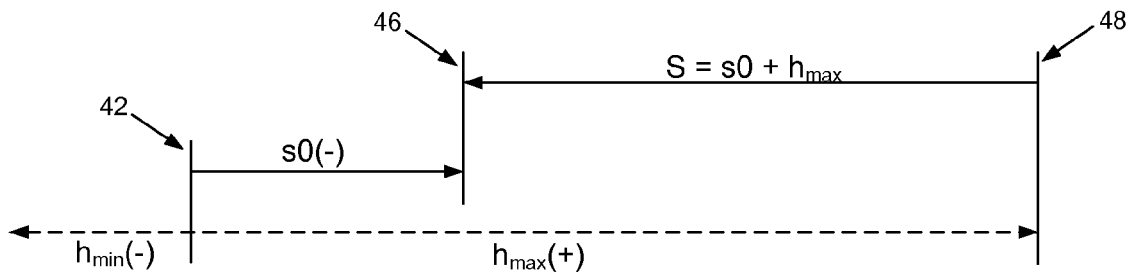

FIG. 4B illustrates an example where the absolute value $|S0+h_{min}|$ is less than the absolute value $|s0+h_{max}|$ and therefore the worst case seek length for the access command is computed as $s0+h_{max}$ (s0 is negative and $h_{max}$ is positive resulting in a reversal of the seek direction). Accordingly, after the head switch the worst case seek will begin at data track 48 and end at data track 46 on the second disk surface. That is, for a short seek as shown in FIG. 4B, the radial offset may actually be greater than the initial seek length s0 such that the worst case seek length corresponds to a reversal in the seek direction. In general, the control circuitry 24 may compute the seek length for an access command according to:

$$ho = \begin{cases} h_{max} & \text{if } |s0 + h_{min}| < |s0 + h_{max}| \\ h_{min} & \text{if } |s0 + h_{min}| \geq |s0 + h_{max}| \end{cases}$$

$$S = s0 + ho$$

where $h_{max}$ represents the first radial offset, $h_{min}$ represents the second radial offset, s0 represents a seek length from a first data track to a second data track associated with an access command in the command queue, and S represents an adjusted seek length processed by the RPO algorithm.

Figure 4C:
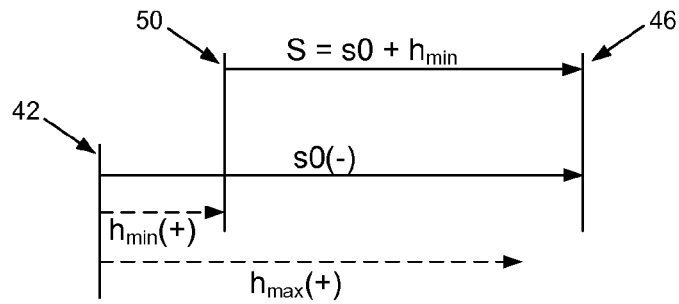

FIG. 4C shows an embodiment where $h_{min}$ and $h_{max}$ have the same polarity which means that the radial offset for both $h_{min}$ and $h_{max}$ are in the same radial direction relative to the data track 42 on the first disk surface. In this case, the above equation will still select between $h_{min}$ and $h_{max}$ in a manner that will compute the worst case seek length which in the example of FIG. 4C is from data track 50 to data track 46.

In one embodiment, the control circuitry 24 generates a matrix of head offset values for storing $h_{min}$ and $h_{max}$ for all of the heads:

$$\begin{bmatrix} m_{11} & \cdots & m_{1j} & \cdots & m_{NN} \\ \vdots & \vdots & \vdots & \vdots & \vdots \\ m_{i1} & \cdots & m_{ij} & \cdots & m_{iN} \\ \vdots & \vdots & \vdots & \vdots & \vdots \\ m_{N1} & \cdots & m_{Nj} & \vdots & m_{NN} \end{bmatrix}$$

where N is the number of heads, $m_{ij}$ is a head offset value between head i and head j, $m_{12}$ stores one of the first and second radial offsets (e.g., $h_{min}$), and $m_{21}$ stores the other of the first and second radial offsets (e.g., $h_{max}$). When the control circuitry 24 computes the seek latency for an access command that requires a head switch, the control circuitry 24 computes the worst case seek using the corresponding $h_{min}$ and $h_{max}$ stored in the above matrix.

In one embodiment, the radial offset between heads may vary across the radius of the disk. Accordingly, in one embodiment the control circuitry 24 may define a plurality of zones on each disk surface, where each zone comprises at least two data tracks, and a plurality of radial offsets may be generated for each zone. For example, the above matrix for the plurality of heads may be generated for each zone, wherein the control circuitry 24 accesses the matrix corresponding to the radial location of the head switch:

$$\begin{bmatrix} m_{11,k} & \cdots & m_{1j,k} & \cdots & m_{NN,k} \\ \vdots & \vdots & \vdots & \vdots & \vdots \\ m_{i1,k} & \cdots & m_{ij,k} & \cdots & m_{iN,k} \\ \vdots & \vdots & \vdots & \vdots & \vdots \\ m_{N1,k} & \cdots & m_{Nj,k} & \vdots & m_{NN,k} \end{bmatrix}$$

where k in the above matrix represents the zone.

In one embodiment, the control circuitry 24 may update the $h_{min}$ and $h_{max}$ while executing access commands during normal operations. This embodiment is understood with reference to the flow diagram of FIG. 5 which extends on the flow diagram of FIG. 2C, wherein when the control circuitry 24 executes a head switch from the first head to the second head in connection with executing an access command (block 52), an updated radial offset between the first head and the second head is measured in connection with the head switch (block 54), and at least one of the first radial offset (e.g., $h_{min}$) and the second radial offset (e.g., $h_{max}$) is updated based on the updated radial offset (block 56). This embodiment may help compensate for a change in the radial offsets that may occur over time, such as if there is slippage of the disks relative to the spindle motor.

Figure 6:
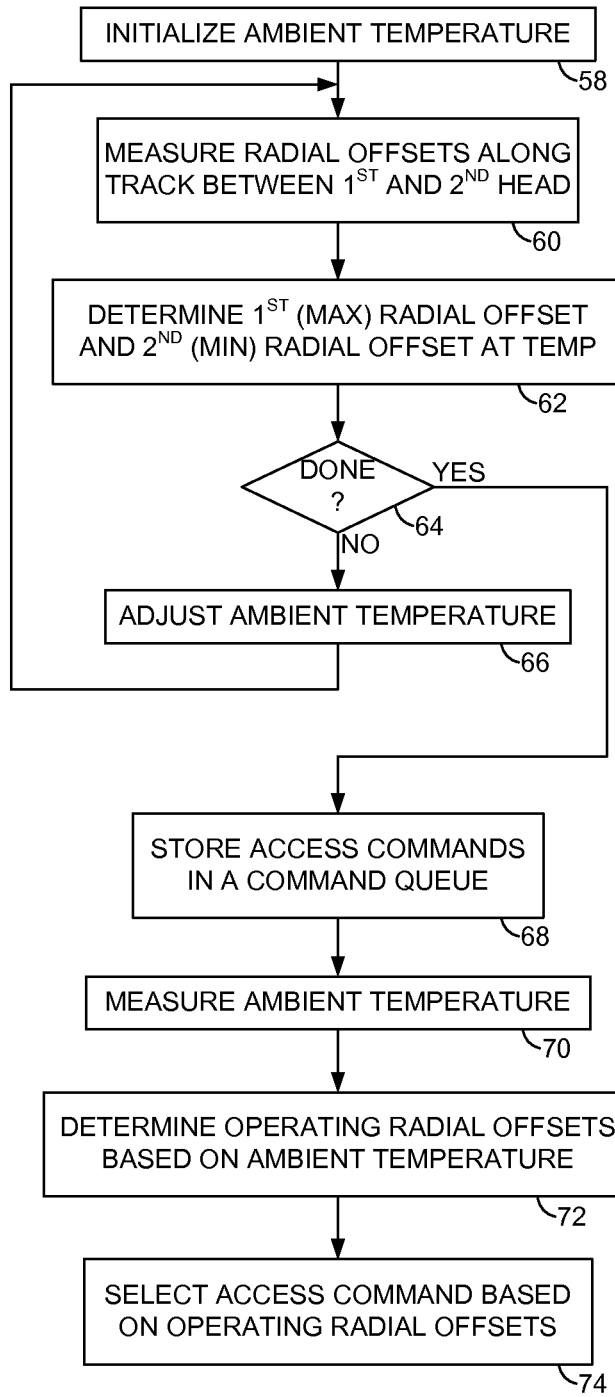
FIG. 6 is a flow diagram according to an embodiment wherein the radial offsets between the heads is determined based on a measured ambient temperature.

In one embodiment, the radial offset between the heads may vary with changes in ambient temperature. Accordingly, in one embodiment the ambient temperature is taken into account when determining the appropriate values for $h_{min}$ and $h_{max}$. This embodiment is understood with reference to flow diagram of FIG. 6, wherein during a manufacturing procedure the ambient temperature is initialized (block 58). The radial offset is then measured between first and second heads at a plurality of points along a circumference of a corresponding first and second disk surface (block 60), and the minimum ($h_{min}$) and maximum ($h_{max}$) radial offsets are determined for the current ambient temperature (block 62). The ambient temperature is then adjusted (block 66) and the flow diagram repeated from block 60 until a sufficient number of radial measurements for $h_{min}$ and $h_{max}$ have been determined over a range of ambient temperatures (block 64). For example, the above-described matrix of radial offsets may be generated over a plurality of different ambient temperatures. During normal operation while the disk drive is deployed in the field, the access commands are stored in the command queue (block 68), the operating ambient temperature is measured (block 70), operating radial offsets $h_{min}$ and $h_{max}$ are determined based on the measured ambient temperature (block 72), and an access command is selected from the command queue based on the operating radial offsets (block 74). The operating radial offsets $h_{min}$ and $h_{max}$ may be determined at block 72 in any suitable manner, such as selecting the radial offsets from the matrix that best matches the operating ambient temperature. In another embodiment, the operating radial offsets $h_{min}$ and $h_{max}$ may be determined by interpolating between the radial offsets stored in the two matrices that bracket the operating ambient temperature.

Figure 5:
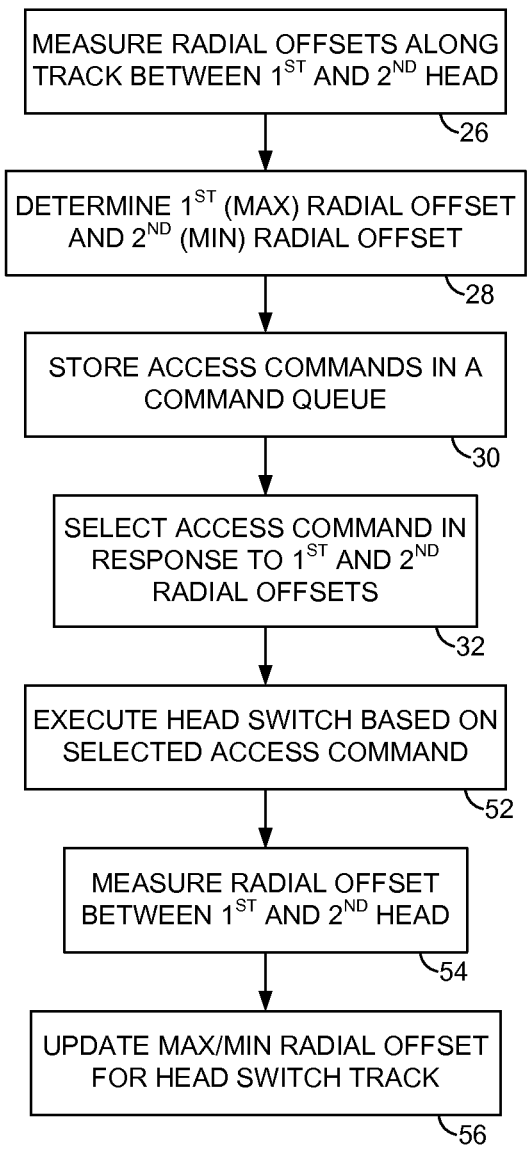
FIG. 5 is a flow diagram according to an embodiment wherein a maximum/minimum radial offset between first and second heads is updated when an access command is executed that requires a head switch.

In yet another embodiment, the ambient temperature may change gradually such that the control circuitry 24 may adapt a single matrix (optionally one matrix per zone) as the ambient temperature changes by executing the flow diagram of FIG. 5 described above. That is, the ambient temperature may be compensated over time similar to compensating for a change to the radial offsets due to disk slippage.

Figure 7A:
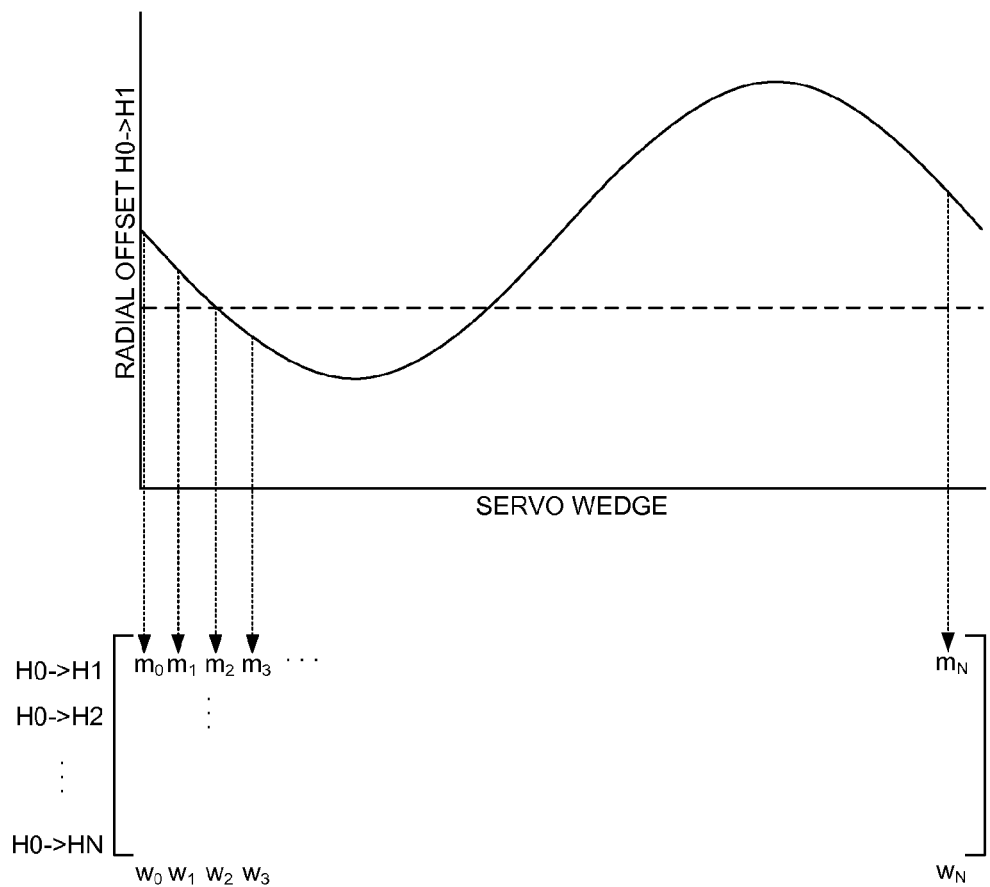
FIG. 7A shows an example embodiment wherein the radial offset measured at the plurality of points along the circumference of the disk are saved in a matrix which may be used to implement the RPO algorithm.

FIG. 7A illustrates an alternative embodiment wherein instead of storing the minimum ($h_{min}$) and maximum ($h_{max}$) radial offsets for a particular head combination and radial location, the radial offset measured at the plurality of points along the circumference of the disk are saved in a matrix. In the example shown in FIG. 7A, the radial offset measured at each servo wedge (servo sector) is saved; however, in other embodiments a coarser resolution may be employed together with a suitable interpolation algorithm for computing the radial offsets at the servo wedges between the saved points. The matrix shown in FIG. 7A is generated for the first head $22_0$, where a similar matrix may be generated for the other heads and the appropriate matrix indexed depending on the head combination during a head switch. In one embodiment, the matrix shown in FIG. 7A may be used to estimate the actual seek length for the RPO algorithm when a head switch occurs at a known servo sector rather than compute the worst case seek length based on the minimum ($h_{min}$) and maximum ($h_{max}$) radial offsets as described above.

Figure 7B:
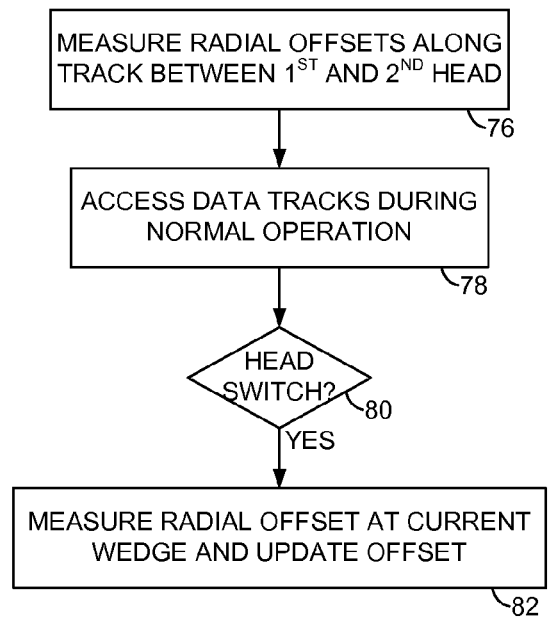
FIG. 7B is a flow diagram according to an embodiment wherein the radial offsets in the matrix of FIG. 7A may be updated when executing access commands that require a head switch.

FIG. 7B is a flow diagram according to an embodiment wherein a radial offset between a first head of a first disk surface and a second head of a second disk surface is measured at a plurality of points along a circumference of a corresponding first and second disk surface to generate a plurality of radial offsets (block 76) such as shown in FIG. 7A. The data tracks on the first disk surface are accessed, and then when a head switch is performed to switch from the first head to the second head near a first servo sector (block 80), the radial offset between the first head and the second head corresponding to the first servo sector is measured in order to update the radial offset (block 82). As described above, the radial offsets in the matrix of FIG. 7A may need to be updated over time due, for example, to disk slippage and/or a gradual change in ambient temperature. In another embodiment, a plurality of the matrix shown in FIG. 7A may be generated over a plurality of different ambient temperatures which may be used to compensate for faster transients in ambient temperature during normal operation similar to the embodiment described above with reference to FIG. 6.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
  a plurality of disk surfaces each comprising a plurality of data tracks;
  a plurality of heads including at least one head actuated over each disk surface; and
  control circuitry operable to:
    measure a radial offset between a first head and a second head at a plurality of points along a circumference of a corresponding first and second disk surface to generate a first plurality of radial offsets;
    determine a first radial offset and a second radial offset based on the first plurality of radial offsets, wherein the first radial offset corresponds to approximately a maximum in the first plurality of radial offsets and the second radial offset corresponds to approximately a minimum in the first plurality of radial offsets;
    store a plurality of access commands in a command queue; and
    execute a rotational position optimization (RPO) algorithm to select a next access command to execute from the command queue, wherein the RPO algorithm is responsive to the first and second radial offsets.

2. The disk drive as recited in claim 1, wherein the control circuitry is operable to compute:

$$ho = \begin{cases} h_{max} & \text{if } |s0 + h_{min}| < |s0 + h_{max}| \\ h_{min} & \text{if } |s0 + h_{min}| \geq |s0 + h_{max}| \end{cases}$$

$$S = s0 + ho$$

where:
$h_{max}$ represents the first radial offset;
$h_{min}$ represents the second radial offset;
s0 represents a seek length from a first data track to a second data track associated with an access command in the command queue; and
S represents an adjusted seek length processed by the RPO algorithm.

3. The disk drive as recited in claim 2, wherein the first data track corresponds to a current access command being executed and the second data track corresponds to a target data track of an access command in the command queue.

4. The disk drive as recited in claim 1, wherein the control circuitry is further operable to generate a matrix of head offset values:

$$\begin{bmatrix} m_{11} & \cdots & m_{1j} & \cdots & m_{NN} \\ \vdots & \vdots & \vdots & \vdots & \vdots \\ m_{i1} & \cdots & m_{ij} & \cdots & m_{iN} \\ \vdots & \vdots & \vdots & \vdots & \vdots \\ m_{N1} & \cdots & m_{Nj} & \vdots & m_{NN} \end{bmatrix}$$

where:
N is the number of heads;
$m_{ij}$ is a head offset value between head i and head j;
$m_{12}$ stores one of the first and second radial offsets; and
$m_{21}$ stores the other of the first and second radial offsets.

5. The disk drive as recited in claim 1, wherein the control circuitry is further operable to:
  define a plurality of zones on each disk surface, where each zone comprises at least two of the data tracks; and
  generate the first plurality of radial offsets for a first zone;
  generate a second plurality of radial offsets for a second zone;
  determine a third radial offset and a fourth radial offset based on the second plurality of radial offsets, wherein the third radial offset corresponds to approximately a maximum in the second plurality of radial offsets and the fourth radial offset corresponds to approximately a minimum in the second plurality of radial offsets.

6. The disk drive as recited in claim 5, wherein the control circuitry is further operable to generate a matrix of head offset values for each zone:

$$\begin{bmatrix} m_{11,k} & \cdots & m_{1j,k} & \cdots & m_{NN,k} \\ \vdots & \vdots & \vdots & \vdots & \vdots \\ m_{i1,k} & \cdots & m_{ij,k} & \cdots & m_{iN,k} \\ \vdots & \vdots & \vdots & \vdots & \vdots \\ m_{N1,k} & \cdots & m_{Nj,k} & \vdots & m_{NN,k} \end{bmatrix}$$

where:
N is the number of heads;
k represents the zone;
$m_{ij}$ is a head offset value between head i and head j;
$m_{12,1}$ stores one of the first and second radial offsets;
$m_{21,1}$ stores the other of the first and second radial offsets;
$m_{12,2}$ stores one of the third and fourth radial offsets; and
$m_{21,2}$ stores the other of the third and fourth radial offsets.

7. The disk drive as recited in claim 1, wherein the control circuitry is further operable to:
  perform a head switch from the first head to the second head in connection with executing one of the access commands;
  measure an updated radial offset between the first head and the second head in connection with the head switch; and
  update at least one of the first radial offset and the second radial offset based on the updated radial offset.

8. The disk drive as recited in claim 1, wherein the control circuitry is further operable to:
  for a first temperature, generate the first plurality of radial offsets and determine the first radial offset and the second radial offset; and
  for a second temperature, generate a second plurality of radial offsets between the first head and the second head and determine a third radial offset and a fourth radial offset based on the second plurality of radial offsets, wherein the third radial offset corresponds to approximately a maximum in the second plurality of radial offsets and the fourth radial offset corresponds to approximately a minimum in the second plurality of radial offsets.

9. The disk drive as recited in claim 8, wherein the control circuitry is further operable to:
  measure an operating temperature of the disk drive;
  determine operating radial offsets based on the first and second radial offsets and the third and fourth radial offsets and the operating temperature; and
  execute the RPO algorithm responsive to the operating radial offsets.

10. The disk drive as recited in claim 1, wherein the control circuitry is further operable to:
  measure an operating temperature of the disk drive;
  determine an operating radial offset based on the first and second radial offsets the operating temperature; and
  execute the RPO algorithm responsive to the operating radial offset.

11. A disk drive comprising:
  a plurality of disk surfaces each comprising a plurality of data tracks, wherein each data track comprises a number of data sectors and a number of servo sectors;
  a plurality of heads including at least one head actuated over each disk surface; and
  control circuitry operable to:
    measure a radial offset between a first head and a second head at a plurality of points along a circumference of a corresponding first and second disk surface to generate a plurality of radial offsets;
    access the data tracks on the first disk surface;
    switch from the first head to the second head near a first servo sector of the first disk surface; and
    measure the radial offset between the first head and the second head corresponding to the first servo sector in order to update the radial offset.

12. The disk drive as recited in claim 11, wherein the control circuitry is further operable to:
  store a plurality of access commands in a command queue; and
  execute a rotational position optimization (RPO) algorithm to select a next access command to execute from the command queue, wherein the RPO algorithm is responsive to the updated radial offset.

13. A method of operating a disk drive comprising:
  measuring a radial offset between a first head and a second head at a plurality of points along a circumference of a corresponding first and second disk surface to generate a first plurality of radial offsets;
  determining a first radial offset and a second radial offset based on the first plurality of radial offsets, wherein the first radial offset corresponds to approximately a maximum in the first plurality of radial offsets and the second radial offset corresponds to approximately a minimum in the first plurality of radial offsets;
  storing a plurality of access commands in a command queue; and
  executing a rotational position optimization (RPO) algorithm to select a next access command to execute from the command queue, wherein the RPO algorithm is responsive to the first and second radial offsets.

14. The method as recited in claim 13, further comprising computing:

$$ho = \begin{cases} h_{max} & \text{if } |s0 + h_{min}| < |s0 + h_{max}| \\ h_{min} & \text{if } |s0 + h_{min}| \geq |s0 + h_{max}| \end{cases}$$

$$S = s0 + ho$$

where:
$h_{max}$ represents the first radial offset;
$h_{min}$ represents the second radial offset;
s0 represents a seek length from a first data track to a second data track associated with an access command in the command queue; and
S represents an adjusted seek length processed by the RPO algorithm.

15. The method as recited in claim 14, wherein the first data track corresponds to a current access command being executed and the second data track corresponds to a target data track of an access command in the command queue.

16. The method as recited in claim 13, further comprising generating a matrix of head offset values:

$$\begin{bmatrix} m_{11} & \cdots & m_{1j} & \cdots & m_{NN} \\ \vdots & \vdots & \vdots & \vdots & \vdots \\ m_{i1} & \cdots & m_{ij} & \cdots & m_{iN} \\ \vdots & \vdots & \vdots & \vdots & \vdots \\ m_{N1} & \cdots & m_{Nj} & \vdots & m_{NN} \end{bmatrix}$$

where:
N is the number of heads;
$m_{ij}$ is a head offset value between head i and head j;
$m_{12}$ stores one of the first and second radial offsets; and
$m_{21}$ stores the other of the first and second radial offsets.

17. The method as recited in claim 13, further comprising:
  defining a plurality of zones on each disk surface, where each zone comprises at least two data tracks on each disk surface; and
  generating the first plurality of radial offsets for a first zone;
  generating a second plurality of radial offsets for a second zone;
  determining a third radial offset and a fourth radial offset based on the second plurality of radial offsets, wherein the third radial offset corresponds to approximately a maximum in the second plurality of radial offsets and the fourth radial offset corresponds to approximately a minimum in the second plurality of radial offsets.

18. The method as recited in claim 17, further comprising generating a matrix of head offset values for each zone:

$$\begin{bmatrix} m_{11,k} & \cdots & m_{1j,k} & \cdots & m_{NN,k} \\ \vdots & \vdots & \vdots & \vdots & \vdots \\ m_{i1,k} & \cdots & m_{ij,k} & \cdots & m_{iN,k} \\ \vdots & \vdots & \vdots & \vdots & \vdots \\ m_{N1,k} & \cdots & m_{Nj,k} & \vdots & m_{NN,k} \end{bmatrix}$$

where:

N is the number of heads;

k represents the zone;

$m_{ij}$ is a head offset value between head i and head j;

$m_{12,1}$ stores one of the first and second radial offsets;

$m_{21,1}$ stores the other of the first and second radial offsets;

$m_{12,2}$ stores one of the third and fourth radial offsets; and $m_{21,2}$ stores the other of the third and fourth radial offsets.

19. The method as recited in claim 13, further comprising:

performing a head switch from the first head to the second head in connection with executing one of the access commands;

measuring an updated radial offset between the first head and the second head in connection with the head switch; and updating at least one of the first radial offset and the second radial offset based on the updated radial offset.

20. The method as recited in claim 13, further comprising:

for a first temperature, generating the first plurality of radial offsets and determining the first radial offset and the second radial offset; and for a second temperature, generating a second plurality of radial offsets between the first head and the second head and determining a third radial offset and a fourth radial offset based on the second plurality of radial offsets, wherein the third radial offset corresponds to approximately a maximum in the second plurality of radial offsets and the fourth radial offset corresponds to approximately a minimum in the second plurality of radial offsets.

21. The method as recited in claim 20, further comprising:

measuring an operating temperature of the disk drive;

determining operating radial offsets based on the first and second radial offsets and the third and fourth radial offsets and the operating temperature; and executing the RPO algorithm responsive to the operating radial offsets.

22. The method as recited in claim 13, further comprising:

measuring an operating temperature of the disk drive;

determining an operating radial offset based on the first and second radial offsets the operating temperature; and executing the RPO algorithm responsive to the operating radial offset.

23. A method of operating a disk drive comprising:

measuring a radial offset between a first head and a second head at a plurality of points along a circumference of a corresponding first and second disk surface to generate a plurality of radial offsets;

accessing data tracks on the first disk surface;

switching from the first head to the second head near a first servo sector of the first disk surface; and measuring the radial offset between the first head and the second head corresponding to the first servo sector in order to update the radial offset.

24. The method as recited in claim 23, further comprising:

storing a plurality of access commands in a command queue; and executing a rotational position optimization (RPO) algorithm to select a next access command to execute from the command queue, wherein the RPO algorithm is responsive to the updated radial offset.

* * * * *